(12) United States Patent
Nam et al.

(10) Patent No.: US 12,449,353 B2
(45) Date of Patent: Oct. 21, 2025

(54) NDIR GAS MEASURING DEVICE FOR DETECTING PRESENCE OF GAS OTHER THAN MEASUREMENT TARGET GAS

(71) Applicant: SESUNG INC., Daegu (KR)

(72) Inventors: Cheol Woo Nam, Daegu (KR); Byung Yul Moon, Daegu (KR); Eung Yul Kim, Daegu (KR); Jae Hwan Kim, Daegu (KR); Chun Ho Shin, Daegu (KR); Kwang Hun Park, Daegu (KR); Myun Gu Choi, Daegu (KR); Chang Hwang Choi, Daegu (KR); Yong Geol Kim, Daegu (KR); Jae Min Jeon, Daegu (KR)

(73) Assignee: SESUNG INC., Daegu (KR)

( * ) Notice: Subject to any disclaimer, the term of this patent is extended or adjusted under 35 U.S.C. 154(b) by 136 days.

(21) Appl. No.: 18/244,045

(22) Filed: Sep. 8, 2023

(65) Prior Publication Data
US 2024/0118196 A1   Apr. 11, 2024

(30) Foreign Application Priority Data
Oct. 7, 2022   (KR) .................... 10-2022-0128594

(51) Int. Cl.
*G01N 21/3504* (2014.01)
*G01N 21/03* (2006.01)
*G01N 21/05* (2006.01)

(52) U.S. Cl.
CPC ......... *G01N 21/3504* (2013.01); *G01N 21/05* (2013.01)

(58) Field of Classification Search
CPC .................... G01N 21/3504; G01N 21/05
See application file for complete search history.

(56) References Cited

FOREIGN PATENT DOCUMENTS

| KR | 10-1842799 | 5/2018 | |
| KR | 10-2019-0085993 | 7/2019 | |
| WO | WO-2017086555 A1 * | 5/2017 | ......... G01N 21/3504 |

* cited by examiner

*Primary Examiner* — Jamil Ahmed
(74) *Attorney, Agent, or Firm* — Ladas & Parry, LLP

(57) ABSTRACT

In the case of a gas in which several gases are mixed, a type and concentration of the gas may be incorrectly measured when measured using only an optical band-pass filter. The invention of the present application is directed to providing a technology in which a plurality of broadband band-pass filters having overlapping regions are provided to calculate a magnitude of absorption for each wavelength band for light passing through each broadband band-pass filter, thereby identifying the presence of a gas of interest and the presence of a gas other than the gas of interest.

3 Claims, 5 Drawing Sheets

[FIG. 1]
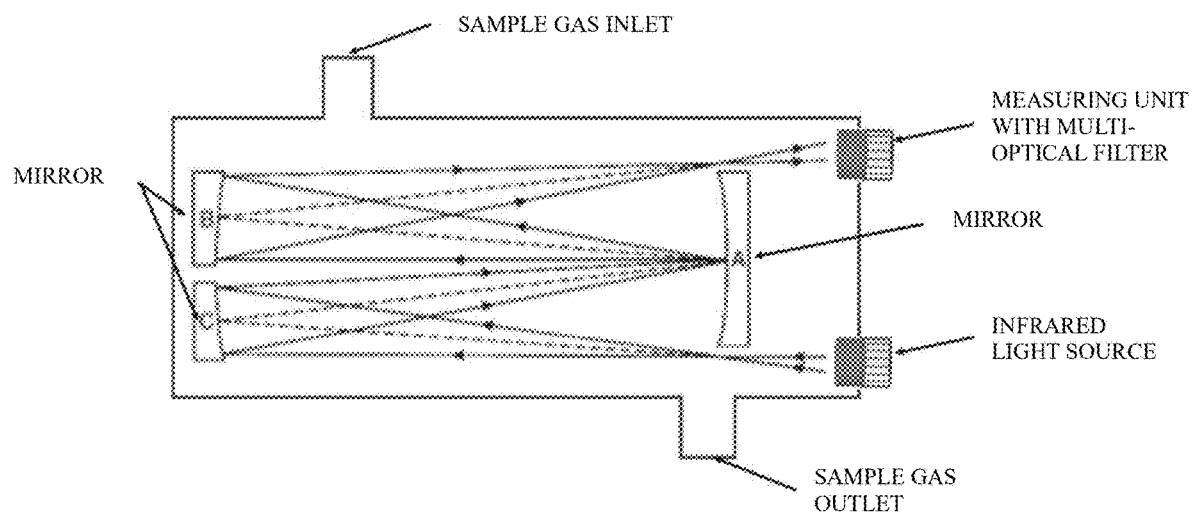
[FIG. 2]
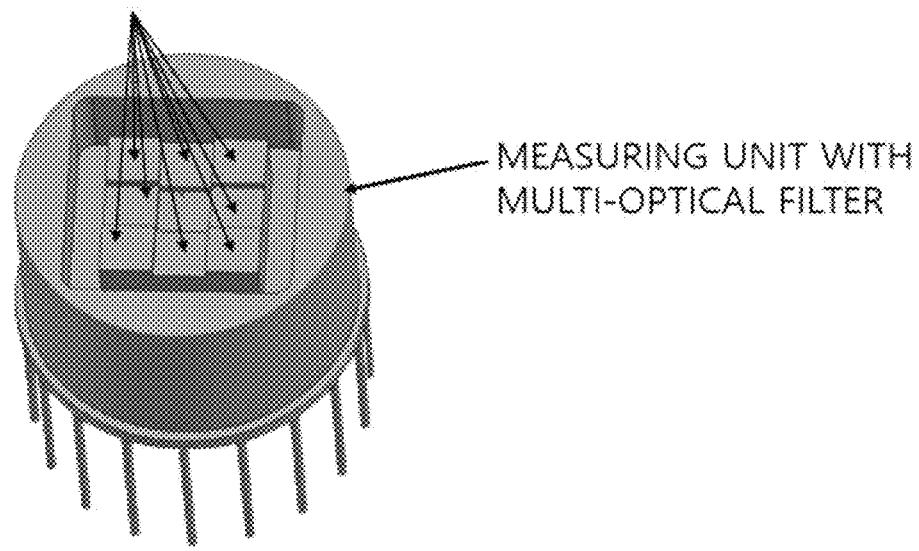

[FIG. 3]
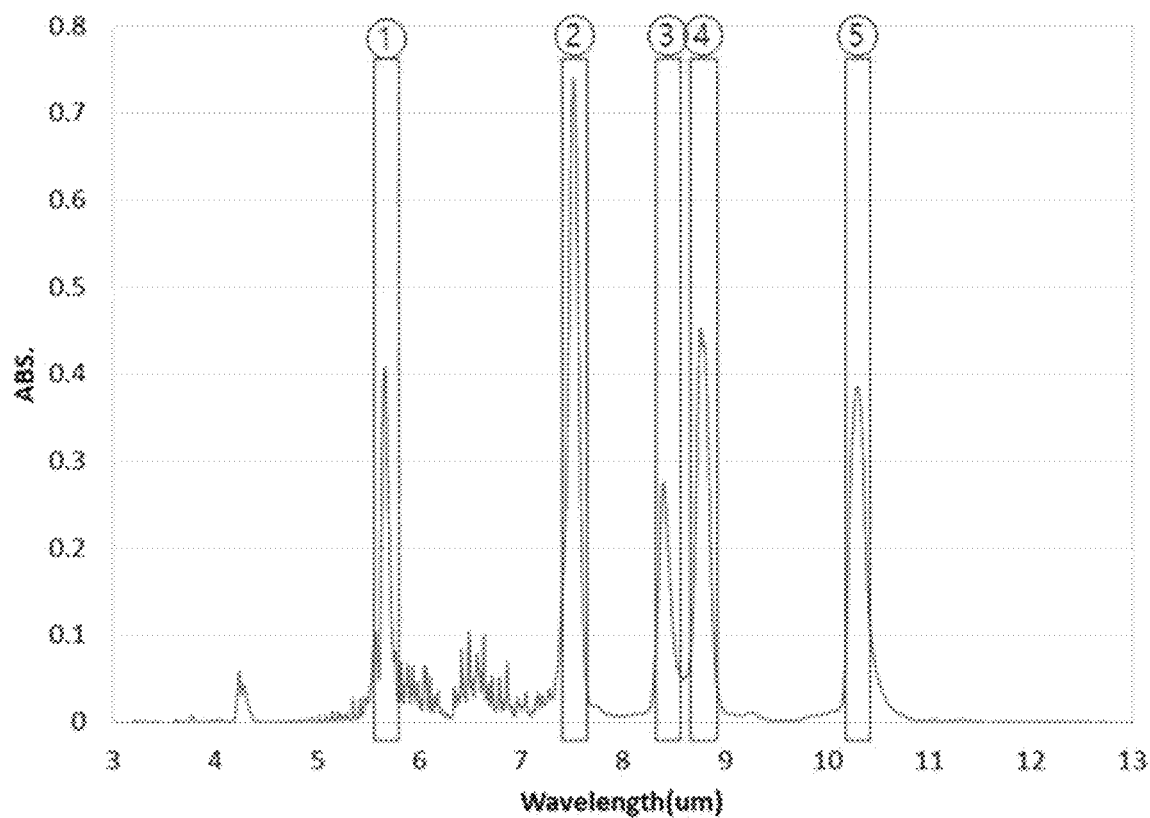

[FIG. 4]
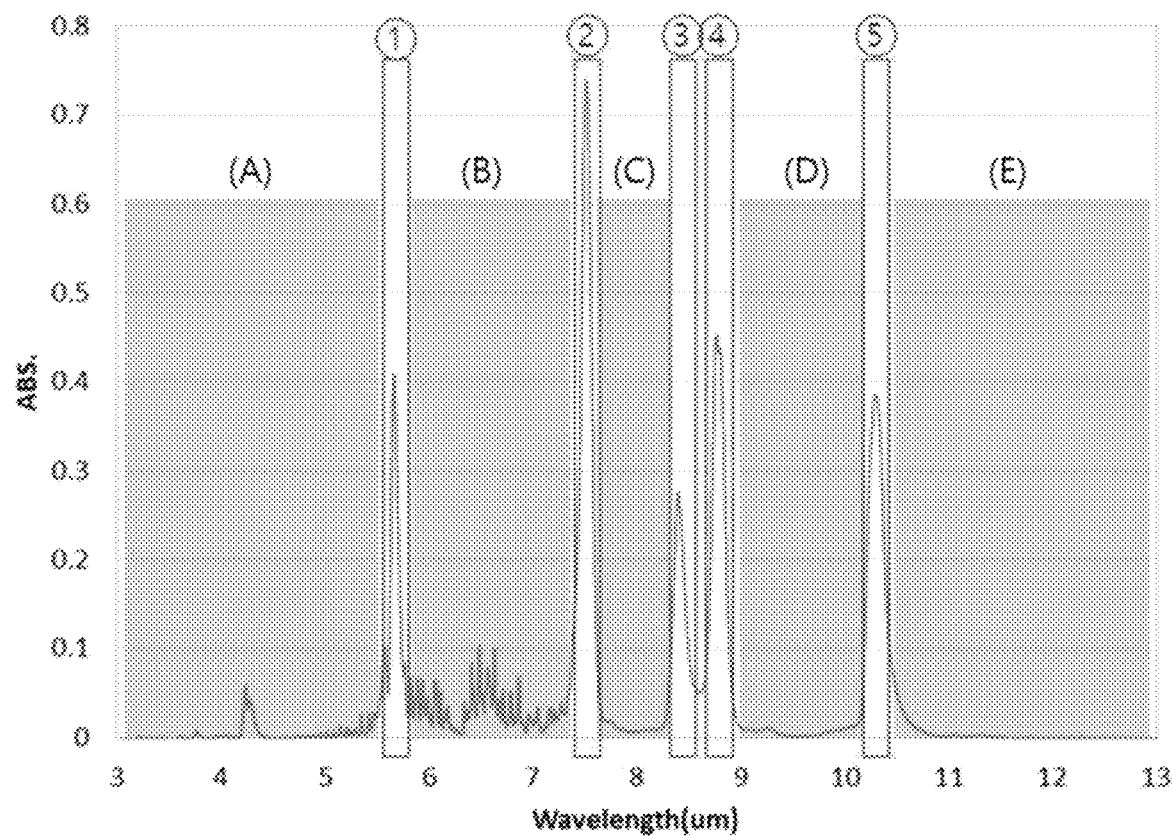

[FIG. 5]
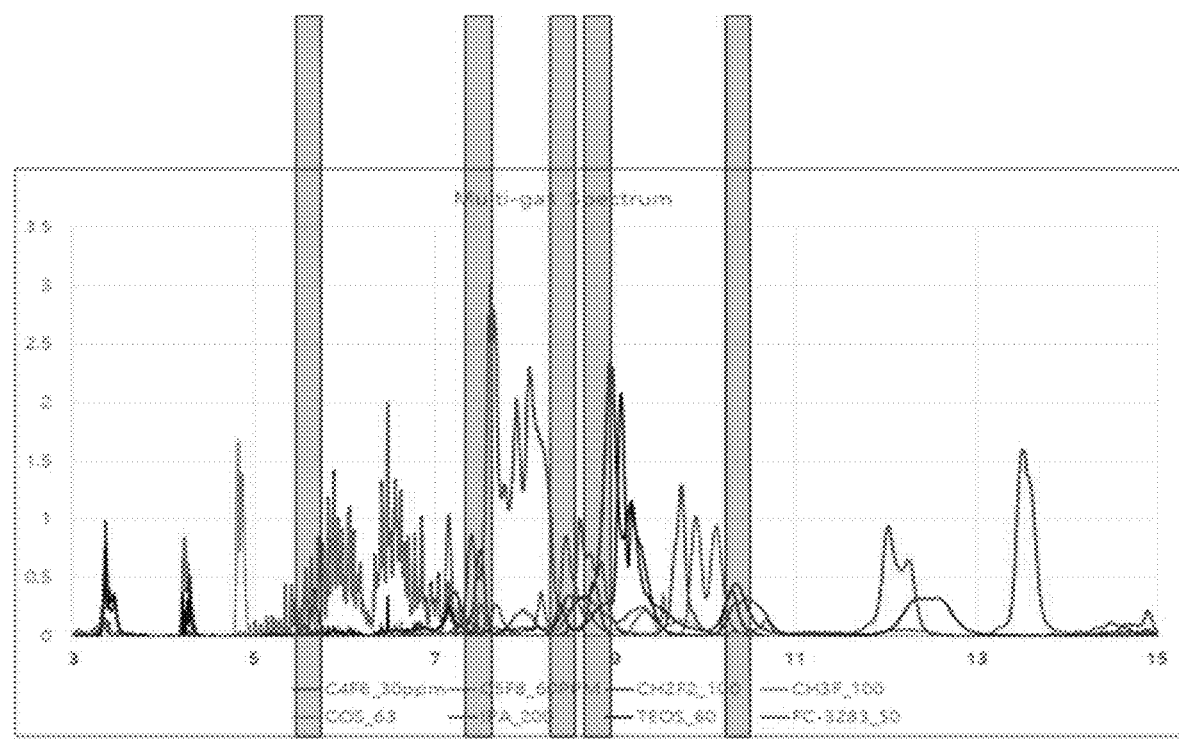

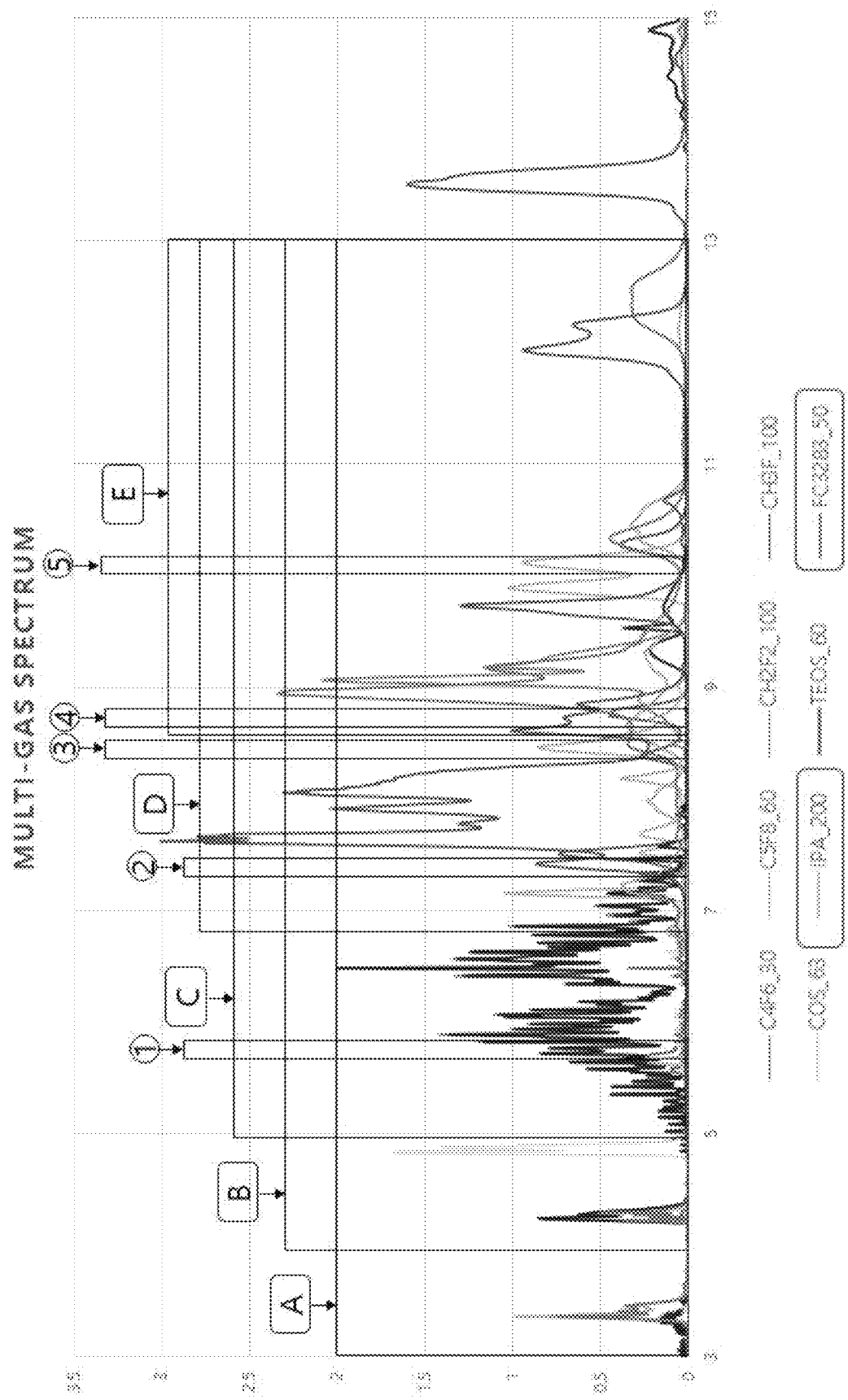
[FIG. 6]

NDIR GAS MEASURING DEVICE FOR DETECTING PRESENCE OF GAS OTHER THAN MEASUREMENT TARGET GAS

CROSS-REFERENCE TO RELATED APPLICATION

This application claims priority to and the benefit of Korean Patent Application No. 10-2022-0128594, filed on Oct. 7, 2022, the disclosure of which is incorporated herein by reference in its entirety.

BACKGROUND

1. Field of the Invention

The invention of the present application relates to a technique for improving the performance of a gas measuring device called a non-dispersive infrared (NDIR) device, and more particularly, to an NDIR gas measuring device having a function of monitoring the presence of gases other than measurement target gases using broadband band-pass filters, which have regions overlapping each other, in addition to selected band-pass filters for target gases having several optical wavelengths.

2. Discussion of Related Art

As a related technology of the application of the present invention, disclosed is a device for detecting non-dispersive infrared (NDIR) glucose in a liquid. The technology is a technology in which a glucose sensor measures glucose molecules in the body through the use of an NDIR device in which scattering noise is reduced through a reflection technique and absorption interference noise (AIN) is suppressed. The technology relates to a technology in which, after signal processing is used to obtain an average ratio value for a reflected signal/reference channel and an interference/reference channel obtained after pulsed beams from a signal, interference, and a reference source are directed at an inclination angle with respect to a vertical line of a spot of a liquid sample substrate, whether a correction curve is valid is determined to then provide a glucose concentration in the liquid sample substrate.

As another related technology, disclosed is a technology for a method of calculating an NDIR correction coefficient and a method of measuring an NDIR gas concentration using a calculated correction coefficient. The technology relates to a method of measuring a gas concentration using an NDIR device and a gas filter correlation (GFC) device. Disclosed is a method of calculating an NDIR correction coefficient including introducing an analyte gas having a reference concentration and an interference gas having a first concentration into an NDIR gas cell, measuring a concentration of the analyte gas using a GFC device and an NDIR device filled with a high-concentration analyte gas, and comparing the measured concentration of the analyte gas, which is changed due to the interference of the interference gas, with the reference concentration to calculate a correction coefficient (K).

RELATED ART DOCUMENTS

Patent Documents (Patent Document 1) Korean Patent Publication No. 10-2019-0085993

(Patent Document 2) Korean Registered Patent Publication No. 10-1842799.

SUMMARY OF THE INVENTION

The present invention is directed to providing a technology for overcoming the disadvantage of a measuring method of a non-dispersive infrared (NDIR) gas sensor which has an advantage of simplicity.

In other words, an NDIR gas measuring device is a non-dispersive gas measuring device and relates to a technology in which, after light is not dispersed and passes through a measurement target sample gas (or gases), by measuring an intensity changing of light which passes through an optical band-pass filter having a wavelength with a certain width and an optical wavelength, at which light is absorbed by a gas of interest, as a center wavelength, what gas is present in the sample gas is identified, and at which concentration the gas is present is measured. However, since a change in absorbance in a narrow region connected to a measurement target gas is measured, in the case of a gas in which several gases are mixed, a type and concentration of the gas may be incorrectly measured when measured using only the optical band-pass filter (or filters). The present invention is directed to providing a technology in which a plurality of broadband band-pass filters having overlapping regions are provided to calculate a magnitude of absorption for each wavelength band for light passing through each optical broadband band-pass filter, thereby identifying the presence of a gas (or gases) of interest and the presence of a gas other than the gas (or gases) of interest.

The configuration of the invention for solving the above problem is as follows.

According to an aspect of the present invention, there is provided a non-dispersive infrared gas measuring device including a gas cell, an infrared light source configured to measure absorbance by a sample gas inside the gas cell and radiate infrared light into the gas cell, and a measuring unit configured to measure an amount of light absorbed at a specific wavelength by the sample gas when the radiated infrared light passes through the sample gas filling the gas cell.

One or more optical band-pass filters for measuring a measurement target gas of interest may be provided at a front end portion of the measuring unit.

Four or more broadband band-pass filters having different ranges which overlap each other from the longest wavelength to the shortest wavelength of the infrared light source are provided to identify whether there is a gas other than the measurement target gas of interest.

Each of a broadband band-pass filter with a shorter region than the optical band-pass filter and a broadband band-pass filter with a longer band than the optical band-pass filter may be provided to identify whether there is a gas other than the measurement target gas of interest.

In the gas cell, in order to increase the absorbance by the sample gas, the infrared light emitted from the infrared light source is repeatedly reflected laterally by mirrors provided at both end portions of the gas cell and then reaches the measuring unit.

BRIEF DESCRIPTION OF THE DRAWINGS

FIG. 1 is a cross-sectional view of a non-dispersive infrared (NDIR) gas measuring device equipped with a multi-optical filter of the present invention.

FIG. 2 is a perspective view of a measuring unit equipped with a multi-optical filter of the present invention.

FIG. 3 is a graph showing a center wavelength and width of an optical band-pass filter that is to be selected to measure $C_4F_6$ gas using the NDIR gas measuring device equipped with the multi-optical filter according to the present invention.

FIG. 4 is a graph showing that, when one or more of first to fifth optical band-pass filters are selected to measure $C_4F_6$ gas in FIG. 3, signals in optical wavelength regions ((A) to (E)) indicated by shading are not measured.

FIG. 5 is a graph showing that, when the first to fifth optical band-pass filters are used in the NDIR gas measuring device, an error occurs in measurement when various gases are mixed in a sample gas for measurement and showing a difficulty in identifying what gas is measured.

FIG. 6 shows an NDIR gas measuring device equipped with broadband band-pass filters having wavelengths of 3 μm to 13 μm (A), 4 μm to 13 μm (B), 5 μm to 13 μm (C), 7 μm to 13 μm (D), and 8.5 μm to 13 μm (E) in addition to the first to fifth optical band-pass filters of the NDIR gas measuring device.

DETAILED DESCRIPTION OF EXEMPLARY EMBODIMENTS

The operation effects of the invention of the present application are illustrated below using the drawings.

FIG. 1 is a cross-sectional view of a non-dispersive infrared (NDIR) gas measuring device equipped with a multi-optical filter of the present invention. After infrared light emitted from an infrared light source provided at a lower right end portion passes through a sample gas filling a gas cell, and a specific wavelength of the infrared light is absorbed differently according to the type of gas included in the sample gas, the infrared light passes through optical band-pass filters, which have various wavelengths and select and transmit a specific optical wavelength, provided at a front end portion of a measuring unit, and thus the measuring unit measures an intensity of light for each wavelength band. When the intensity of light is measured in this way, a case in which light is not absorbed by the sample gas and a ratio thereof are calculated to calculate a degree of light absorption according to the Beer-Lambert law. A magnitude of the degree of light absorption is calculated for each optical wavelength band to measure a type and concentration of gas included in the sample gas. Here, in order to increase a light absorption time, mirrors are provided at both end portions of a gas cell to allow light emitted from the infrared light source to pass through the gas cell several times so that the light absorption can be measured even when a low-concentration gas is included. However, when a type and concentration of a gas are measured in this way, only infrared light, in which only a selected light wavelength is transmitted, is measured, and the NDIR gas measuring device has a disadvantage in that, when an unexpected gas is included in the sample, there is no way to find out what the unexpected gas is.

FIG. 2 is a perspective view of a measuring unit equipped with a multi-optical filter of the present invention. For example, a sensor is divided into nine regions. Light having an infrared wavelength is incident on a central region in which an optical filter is not provided, and optical band-pass filters having different optical center frequencies and bandwidths are provided in eight peripheral regions. In the invention of the present application, among eight optical band pass-filters, four optical band pass-filters may be used as optical band-pass filters capable of distinguishing a gas for detecting a gas of interest and measuring a concentration thereof, and the remaining four optical band-pass filters may be broadband band-pass filters and may be provided as broadband band-pass filters having different overlapping regions in which one sides of broadband optical wavelengths coincide with each other and the other sides thereof are different.

FIG. 3 is a graph showing a center wavelength and width of an optical band-pass filter that is to be selected to measure $C_4F_6$ gas using the NDIR gas measuring device equipped with the multi-optical filter according to the present invention. The optical band-pass filter may be provided to select one or more of peaks through which characteristics of a gas may be distinguished from those of other gases to identify a concentration and type of gas.

FIG. 4 is a graph showing that, when one or more of first to fifth optical band-pass filters are selected to measure $C_4F_6$ gas in FIG. 3, signals in optical wavelength regions (A) to (E) indicated by shading are not measured. When a gas not intended to be measured is included in a sample gas, the inclusion of other gases may not be known with the NDIR measuring device using the first to fifth optical band-pass filters shown in FIG. 4, and mixing of other gases also affects results of measuring signals passing through the first to fifth optical band-pass filters, and thus faulty types and concentrations of gases may be displayed as measurement results.

FIG. 5 is a graph showing that, when the first to fifth optical band-pass filters are used in the NDIR gas measuring device, an error occurs in measurement when various gases are mixed in a sample gas for measurement and showing a difficulty in identifying what gas is measured. As confirmed in the graph, there are cases in which only one gas is measured by the selected optical band-pass filter, but there are also cases in which various gases are all measured by the band-pass filter having a specific optical wavelength. In such cases, it is impossible to identify a type and concentration of the gas only with a value measured by the selected optical band-pass filter. In addition, it is not easy to provide a large number of optical band-pass filters.

FIG. 6 shows an NDIR gas measuring device equipped with broadband band-pass filters having optical wavelength bands of 3 μm to 13 μm (A), 4 μm to 13 μm (B), 5 μm to 13 μm (C), 7 μm to 13 μm (D), and 8.5 μm to 13 μm (E) in addition to the first to fifth optical band-pass filters of the NDIR gas measuring device. In the invention of the present application, instead of a method of providing a larger number of optical band-pass filters, broadband optical filters having a wide band width are provided as two or more broadband optical filters, preferably four broadband optical filters having various pass band widths of which one sides have the same frequency. Thus, by comparing magnitudes of signals of broadband optical band-pass filters that are closest to each other, a magnitude of absorbance generated in a non-overlapping region can be calculated. When the magnitude of the absorbance in the non-overlapping region is greater, other gases may be present. The magnitude of the absorbance may be compared with a magnitude of absorbance for each wavelength band according to types of the other gases to select a type of gas with a large absorption signal as a candidate gas that may be included in a sample gas, and the number of candidates for gases, which may be included in a ratio to a magnitude of the total absorption signal, may be reduced. By checking an absorption ratio according to various combinations of broadband optical band-pass filters excluding overlapping parts in other regions, a type of unidentified gas may be identified. When a type of gas mixed in this way is identified, changes in absorbance according to a concentration of the mixed gas may be virtually combined using the identified type of gas, and thus a type and concentration of the gas can be more accurately measured from an NDIR measurement signal of a measured sample gas as compared with an existing method.

In general, since a larger amount of light is incident on a measuring unit as a width of a measurement frequency band is larger, less light absorption is measured. Therefore, a magnitude of a signal of region (A) is greater than that of a signal of region (B). However, since light is absorbed near a wavelength of 3.5 μm, the magnitude of the signal of region (A) is not much greater than that of the signal of region (B) as compared with a gas that does not absorb light near a wavelength of 3.5 μm. When region (C) is compared with region (D), since a portion having high light absorption is present in only region (C), there is little difference in signal between region (C) and region (D). In this case, when a type of gas with high light absorption is identified in a wavelength band included only in region (C), it can be seen that there is a high possibility that $CH_3F$ is included in a sample gas. In addition, regarding a wavelength band included only in region (D), it can be seen that, when light absorption is high, there is a high possibility that isopropyl alcohol (IPA) is included in a measured sample gas. This content has been described merely as an example, and when a broadband optical band-pass filter and a normal or narrowband optical band-pass filter are used, FIG. 6 shows that, when there is a gas that is mixed in gases that may be included in a measured sample gas, the gas can be identified.

The configuration of the invention for exhibiting the above operation effects is as follows.

Provided is an NDIR gas measuring device including a gas cell, an infrared light source for measuring absorbance by a sample gas inside the gas cell and radiating infrared light into the gas cell, and a measuring unit for measuring an amount of light absorbed at a specific wavelength by the sample gas when the radiated infrared light passes through the sample gas filling the gas cell, wherein one or more optical band-pass filters for measuring a gas of interest are provided at a front end portion of the measuring unit.

In addition, provided is the NDIR gas measuring device in which four or more broadband band-pass filters having different ranges which overlap each other from the longest wavelength to the shortest wavelength of the infrared light source are provided to identify whether there is a gas other than the measurement target gas of interest.

Furthermore, provided is the NDIR gas measuring device in which each of a broadband band-pass filter with a shorter region than the optical band-pass filter and a broadband band-pass filter with a longer band than the optical band-pass filter is provided to identify whether there is a gas other than the measurement target gas of interest.

In addition, provided is the NDIR gas measuring device in which, in the gas cell, in order to increase absorbance by the sample gas, the infrared light emitted from the infrared light source is repeatedly reflected laterally by mirrors provided at both end portions of the gas cell and then reaches the measuring unit.

According to the invention of the present application, it is possible to identify whether there are a measurement target gas of interest and a gas other than the measurement target gas of interest, and when there is the gas other than the measurement target gas of interest, there is an effect of identifying the presence or absence of the measurement target gas of interest and correcting a concentration of the measurement target gas of interest using a signal magnitude.

What is claimed is:

1. A non-dispersive infrared gas measuring device comprising:
   a gas cell;
   an infrared light source configured to measure absorbance by a sample gas inside the gas cell and radiate infrared light into the gas cell; and
   a measuring unit configured to measure an amount of light absorbed at a specific wavelength by the sample gas when the radiated infrared light passes through the sample gas filling the gas cell,
   wherein, in the gas cell, in order to increase absorbance by the sample gas, the infrared light emitted from the infrared light source is repeatedly reflected laterally by mirrors provided at both end portions of the gas cell and then reaches the measuring unit, five optical band-pass filters configured to measure measurement target gases of interest are provided at a front end portion of the measuring unit, and optical five broad band-pass filters, which have different optical wavelength bands of 3 μm to 13 μm (A), 4 μm to 13 μm (B), 5 μm to 13 μm (C), 7 μm to 13 μm (D), and 8.5 μm to 13 μm (E) which overlap each other from a longest wavelength to a shortest wavelength of the infrared light source, are provided to identify whether there is a gas other than the measurement target gases of interest so that magnitudes of signals of broadband optical band-pass filters which are closest to each other are compared to calculate a magnitude of absorbance generated in a non-overlapping region, a greater magnitude of the absorbance in the non-overlapping region indicates that other gases are present, the magnitude of the absorbance is compared with a magnitude of absorbance for each wavelength band according to types of the other gases to select a type of gas with a large absorption signal as a candidate gas included in the sample gas, and an absorption ratio is checked according to various combinations of the broadband optical band-pass filters excluding overlapping parts in other regions to virtually combine changes in absorbance according to a concentration of a mixed gas and accurately measure a type and concentration of gas from an NDIR measurement signal of the measured sample gas.

2. The non-dispersive infrared gas measuring device of claim 1, wherein the five optical band-pass filters have center frequencies of 5.6 μm, 7.5 μm, 8.3 μm, 8.8 μm, and 10.3 μm.

3. The non-dispersive infrared gas measuring device of claim 2, wherein one of the measurement target gases of interest is $C_4F_6$ gas.

* * * * *